United States Patent [19]

Bolin

[11] Patent Number: 4,853,023

[45] Date of Patent: Aug. 1, 1989

[54] GLASSWARE FORMING MACHINE

[75] Inventor: James A. Bolin, Tulsa, Okla.

[73] Assignee: Liberty Glass Company, Sapulpa, Okla.

[21] Appl. No.: 202,977

[22] Filed: Jun. 6, 1988

[51] Int. Cl.$^4$ .............................................. C03B 9/353
[52] U.S. Cl. ........................................ 65/323; 65/313; 65/360
[58] Field of Search ................. 65/360, 323, 313, 246, 65/264

[56] References Cited

U.S. PATENT DOCUMENTS 2,018,785 10/1935 Harrison ................................ 65/360
3,472,639 10/1969 Mumford ........................... 65/323 X Primary Examiner—Arthur Kellogg
Attorney, Agent, or Firm—Senniger, Powers, Leavitt and Roedel

[57] ABSTRACT

This invention relates to a glassware forming machine of the type comprising a pair of carriers each pivoted on a first generally vertical axis for swinging movement toward and away from each other between an open position and a closed position, and a set of at least three mold members carried by each carrier, each mold member on each carrier being related to a mold member on the other carrier so that, with the carriers in their closed position, each mold member on one carrier mates with a mold member on the other carrier to define a mold cavity for molding an item of glass. The improvement involves a holding assembly on each carrier for holding a respective set of mold members. This holding assembly includes a first holder which is pivoted on a respective carrier for holding one or more mold members of the set for pivotal movement relative to the carrier on a second vertical axis, and a second holder pivoted on the first holder for holding the remaining mold members of the set for pivotal movement on a third vertical axis relative to the first holder and the one or more mold members held thereby. The arrangement is such that, as the carriers swing to their closed position and respective mold members move into mating relationship, the first and second holders of said holding assemblies and the mold members held thereby pivot about their respective second and third axes to final positions wherein substantially the same closing pressure is applied to each pair of mating mold members.

11 Claims, 7 Drawing Sheets

GLASSWARE FORMING MACHINE

BACKGROUND OF THE INVENTION

This invention relates generally to glassware forming machines, and more particularly to a system for equalizing the closing forces applied to each pair of mold halves on a machine having three or more pairs of mold halves.

The invention is especially directed to a system for equalizing mold-closing pressures in an individual section (IS) "triple-gob" or "quadruple-gob" glassware forming machine of the type shown in U.S. Pat. Nos. 3,472,639, 3,586,491, 3,607,207, 3,617,232, 4,448,600, 4,449,996 and 4,486,215, where it has been difficult o achieve proper closing of each of the three or four pairs of mold halves. One of the problems has been that the closing pressures applied to the pairs of mold halves has been substantially different, with excessive closing pressures being exerted on some mold halves and insufficient closing pressures being exerted on others.

SUMMARY OF THE INVENTION

Among the several objects of this invention may be noted the provision of a glassware forming machine of the aforementioned type having three (or more) pairs of mold halves and equipped with a system which substantially equalizes the closing pressures applied to the pairs of mold halves; the provision of such a system which is reliable and durable in operation; and the provision of such a design which is relatively simple in design for economical manufacture.

In general, the invention is embodied in a glassware forming machine of the type comprising a pair of carriers each pivoted on a first generally vertical axis for swinging movement toward and away from each other between an open position and a closed position, and a set of at least three mold members carried by each carrier, each mold member on each carrier being related to a mold member on the other carrier so that, with the carriers in their said closed position, each mold member on one carrier mates with a mold member on the other carrier to define a mold cavity for molding an item of glass. The improvement comprises a holding assembly on each carrier for holding a respective set of mold members. This holding assembly comprises a first holder for holding one or more mold members of a respective set of mold members, means mounting the first holder on a respective carrier for pivotal movement of the first holder and said one or more mold members held thereby relative to the carrier on a second vertical axis, a second holder for holding the remaining mold members of a respective set of mold members, and means mounting the second holder on the first holder for pivotal movement of the second holder and said remaining mold members held thereby on a third vertical axis relative to the first holder and said one or more mold members held thereby. The arrangement is such that, as the carriers swing to their closed position and respective mold members move into mating relationship, the first and second holders of the holding assemblies, and the mold members held thereby, are adapted to pivot about their respective second and third axes to final positions wherein substantially the same closing pressure is applied to each pair of mating mold members.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
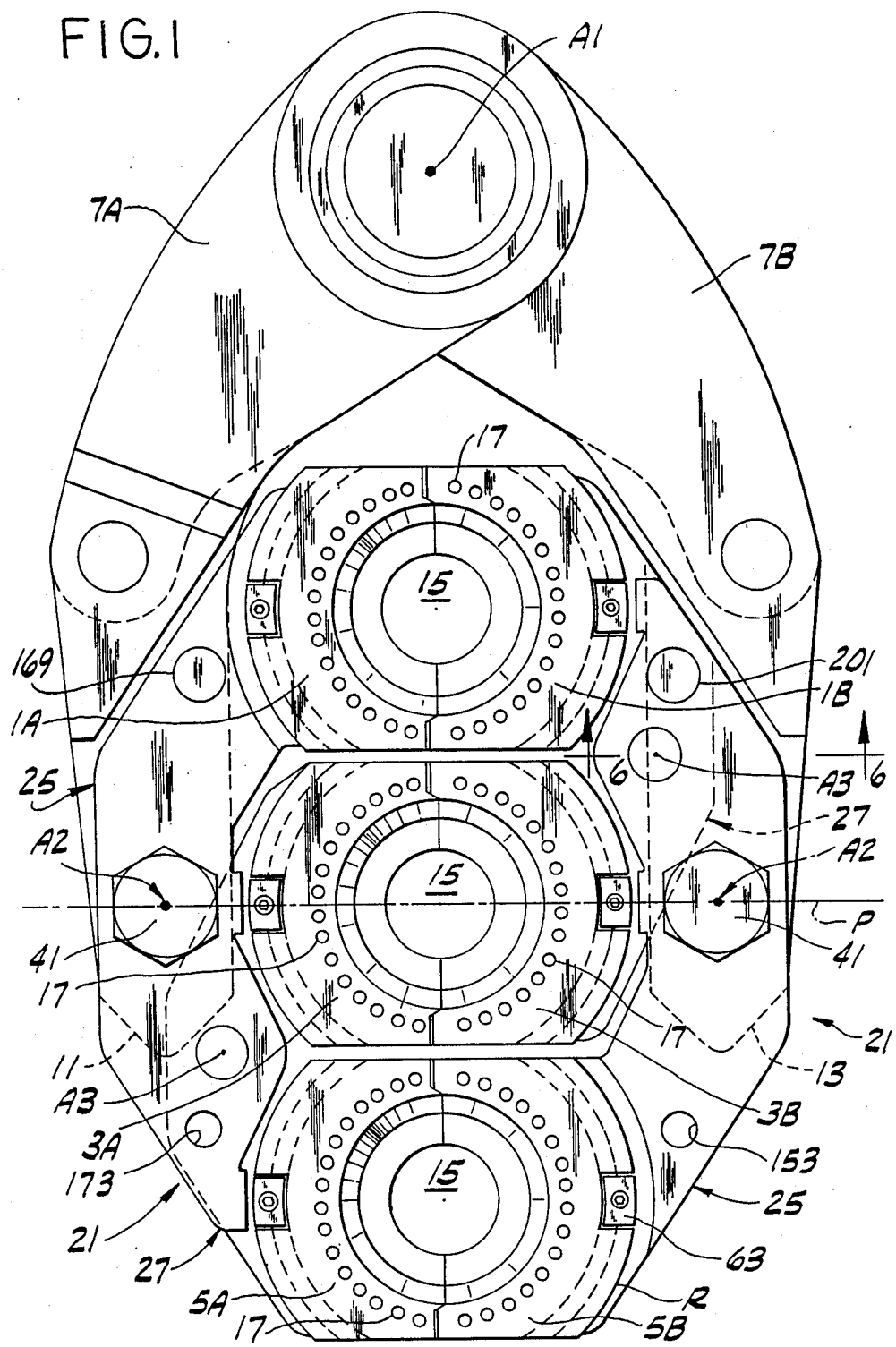
FIG. 1 is plan view of a glassware forming machine comprising a pair of mold arms having mounted thereon mold holding assemblies of the present invention, the mold arms being shown in their closed position wherein the mold members held by the holding assemblies are in mating engagement.
Figure 2:
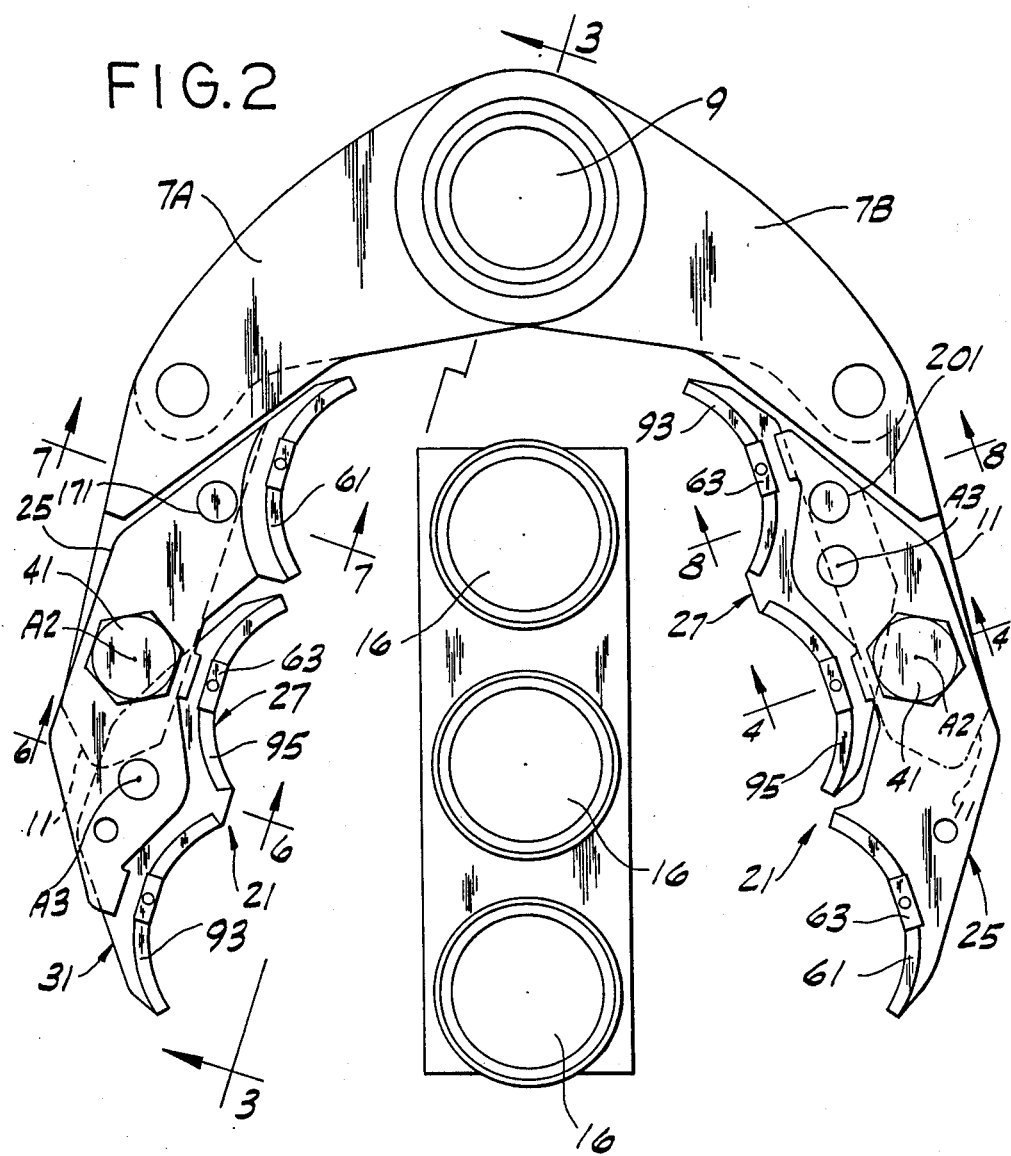
FIG. 2 is a view similar to FIG. 1 showing the mold arms in an open position, the mold members being removed for clarity.

Referring to the drawings, the invention is illustrated as it is embodied in what is called the "mold side" of an individual section of a cyclically operating glassware forming machine of the individual section type where parisons or blanks, formed on the parison or blank molding side of the section, are blown to form the final product, e.g., bottles. It will be understood, however, that the invention may be embodied in the blank molding side of a section. As illustrated, the stated section of the glassware forming machine is of the type referred to as a triple gob section, comprising three pairs of mold members 1, 3 and 5 for molding three bottles at a time, each member constituting a mold half. It will be understood, however, that the invention is applicable to glassware forming machine sections having more than three pairs of mold members, such as a quadruple (four-gob) section. The two mold members of the first pair are designated 1A and 1B, the two members of the second pair are designated 3A and 3B and the two members of the third pair are designated 5A and 5B. The three mold members 1A, 3A and 5A, constituting one set of mold members, are carried by a carrier in the form of a first mold arm 7A and the three mold members 1B, 3B, 5B, constituting another set of mold members, are carried by a carrier in the form of a second mold arm 7B, the mold arms being pivoted on a first and fixed generally vertical axis indicated at A1 for swinging movement toward and away from each other between a closed position in which they are illustrated in FIG. 1, wherein mold members 1A and 1B, 3A and 3B, and 5A and 5B are closed on and mate with each other for the blow molding of a blank into a bottle in each of the closed pairs of members, and an open position in which they are illustrated in FIG. 2, wherein the two mold members of each pair of mold members are spaced from each other for entry therebetween of blanks and for removal of completed bottles. The mold arms 7A and 7B are pivoted on a vertical shaft 9 which extends up from the top of a base (not shown) of the stated individual section of the glassware forming machine, suitable mechanism well-known in the art being provided for cyclically swinging the mold arms between their open and closed positions for the bottle molding process. Each mold arm 7A, 7B is of the type having an upper generally horizontal extension 11 and a lower generally horizontal extension 13 spaced below the upper extension.

Each mold member 1A, 1B, 3A, 3B, 5A and 5B constitutes a mold half, having a cavity 15 therein which is shaped in accordance with the shape of a bottle to be formed so that, with the two mold halves brought together in closed position, the cavities of the two mold halves define the shape of the wall and the neck of the bottle. At the bottom, the two mold halves of each pair close on a mold bottom member 16 as well known in the art. The bottom of the bottle is formed against the mold bottom member, and the bottle is supported on the latter when the mold halves open. Each mold half has air passages such as indicated at 17 extending upwardly from the bottom thereof, each of these passages opening into the ambient atmosphere at its upper end for passage of air through the passages for cooling the mold half, the air exiting into the ambient atmosphere from the upper ends of the passages.

In accordance with the present invention, the mold members of each set are held on a respective mold arm 7A, 7B by upper and lower mold holding assemblies generally designated 21 and 23, respectively. The upper assembly 21 on each mold arm comprises a first upper holder 25 mounted on the upper extension 11 of the mold arm for pivotal movement of the holder on a vertical axis A2, and a second upper holder 27 mounted on holder 25 for pivotal movement of the second upper holder on a third vertical axis A3. The lower assembly 23 on each mold arm is similar to the upper assembly 21, comprising a first lower holder 29 mounted on the underside of the lower extension 13 of the mold arm for pivotal movement of the holder on axis A2, and a second lower holder 31 mounted on holder 29 for pivotal movement of the second lower holder on axis A3. The first upper and lower holders 25, 29 of the upper and lower assemblies 21, 23 are adapted to hold one mold member of a respective set of mold members (e.g., mold member 1A on mold arm 7A and mold member 5B on mold arm 7B) for pivotal movement of the mold member about axis A2, and the second upper and lower holders 27, 31 of the upper and lower assemblies are adapted to hold the remaining mold members of the set (e.g., mold members 3A and 5A on mold arm 7A and mold members 1B and 3B on mold arm 7B) for pivotal movement of the mold members about axis A3.

The upper and lower assemblies 21, 23 on mold arm 7A are identical in construction to the upper and lower assemblies 21, 23 on mold arm 7B, but the orientation of the assemblies is preferably reversed, as illustrated in FIG. 1. Thus, the pivot axes A2 of the first upper and lower holders 25, 29 on the mold arms are disposed in the same generally vertical plane P extending transversely with respect to the mold arms when the mold arms are closed, and the pivot axes A3 of the second upper and lower holders 37, 31 are located substantially equidistant from plane P but on opposite sides of the plane. The arrangement is such that, when the mold arms 7A, 7B are closed, the mold member 1A held by the first upper and lower holders 25, 29 on mold arm 7A mates with the mold member 1B held by the second upper and lower holders 27, 31 on mold arm 7B, the mold member 3A held by the second upper and lower holders 27, 31 on mold arm 7A mates with the mold member 3B held by the second upper and lower holders 27, 31 on mold arm 7B, and the mold member 5A held by the second upper and lower holders 27, 31 on mold arm 7A mates with the mold member 5B held by the first upper and lower holders 25, 29 on mold arm 7B.

Figure 4:
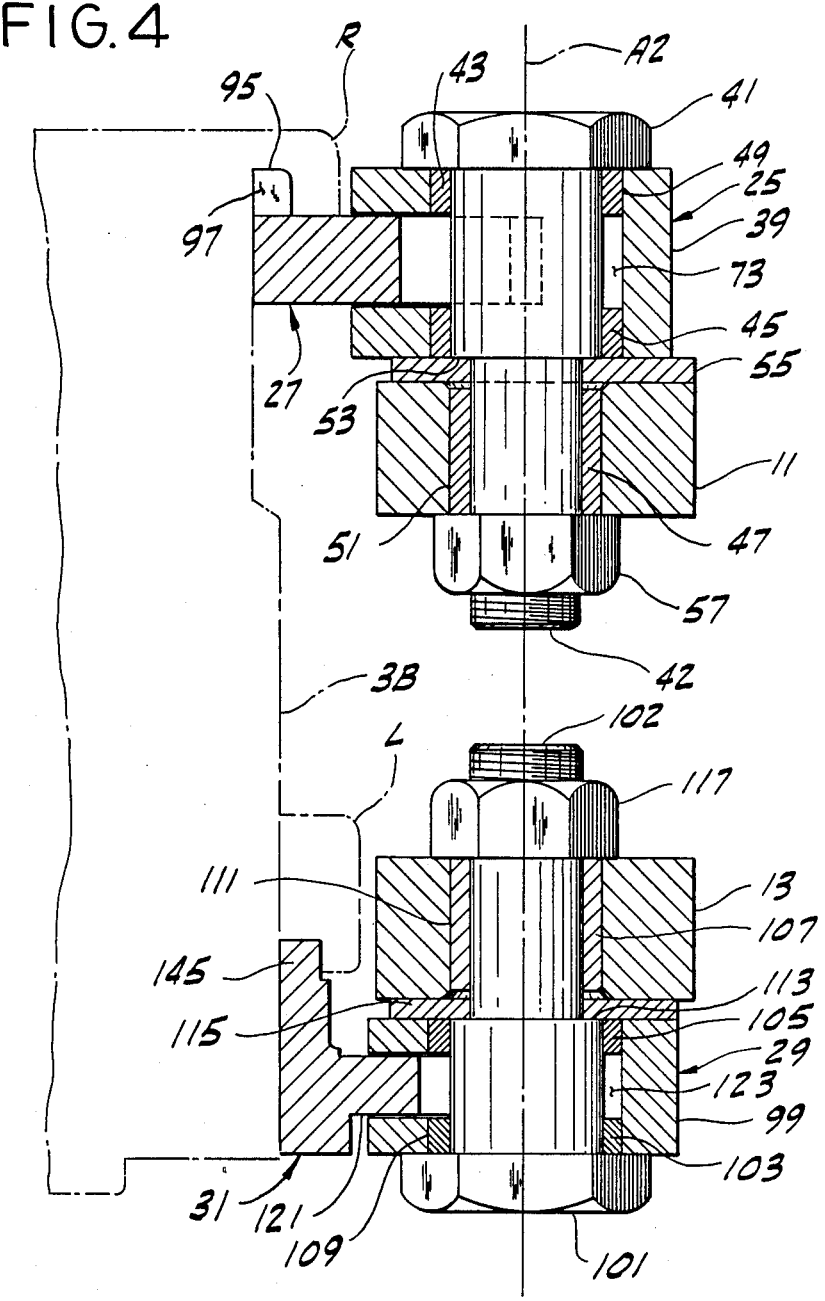
FIG. 4 is a vertical section taken on line 4—4 of FIG. 2.

The first upper holders 25 on the mold arms 7A, 7B are fabricated as substantially identical parts, each comprising a flat bar 39 of rectangular cross section (see FIG. 5) pivoted generally at the center of the bar on the upper extension of a respective mold arm by means of a pivot member in the form of a shoulder bolt 41 having a shank 42 extending down through bushings 43, 45, 47 press-fitted in cylindrical bores 49 and 51 in the bar and mold arm extension 11, respectively (see FIG. 4). The holder 25 is thus adapted to pivot in a generally horizontal plane on axis A2, albeit only to a limited extent, as will appear. The shank 42 of the bolt is formed to have a shoulder 53 engageble with a wear plate 55 of suitable wear-resistant material disposed between the holder bar 39 and the upper extension 11 of the mold arm. A nut 57 tightened on the lower end of the bolt shank 42 retains the upper holder 25 on the mold arm, the distance between the underside of the head of the bolt and the shoulder 53 of the bolt being slightly greater than the thickness of the holder bar 39 to ensure that the holder 25 may freely pivot on axis A2 when the nut is tightened. The holder bar 39 has an arcuate flange 61 at one end thereof for holding a respective mold member at its upper end (see FIG. 5). The flange 61 is curved to match the curvature of the wall of the mold member and is notched at 62 for receiving a removable locator block 63 therein. The locator block 63 is receivable in a corresponding notch in the rim R of the mold member to ensure that the mold member is precisely located with respect to the upper mold support member 25. The rim of the mold member is shaped to hook over the upper edge of the flange 61 on opposite sides of the locator block 63 so that the mold member is securely held in the position shown in FIG. 1.

Figure 6:
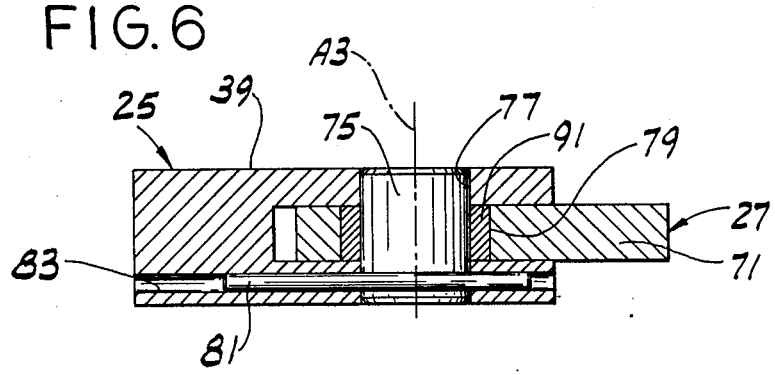
FIG. 6 is a vertical section on line 6—6 of Fig. 2.
Figure 3:
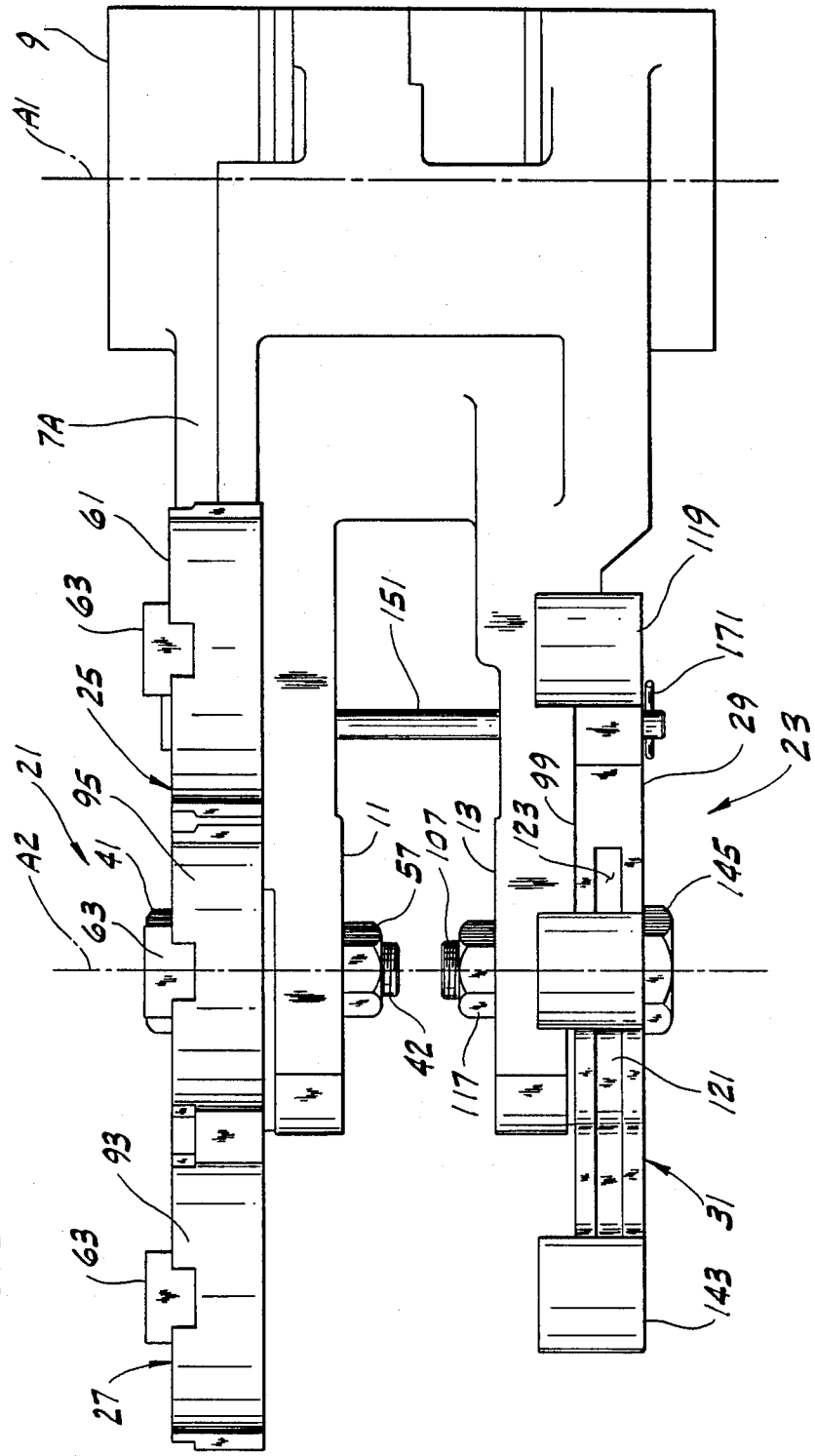
FIG. 3 is a vertical elevation as viewed from line 3—3 of FIG. 2 showing one mold arm with upper and lower mold holding assemblies mounted thereon.
Figure 5:
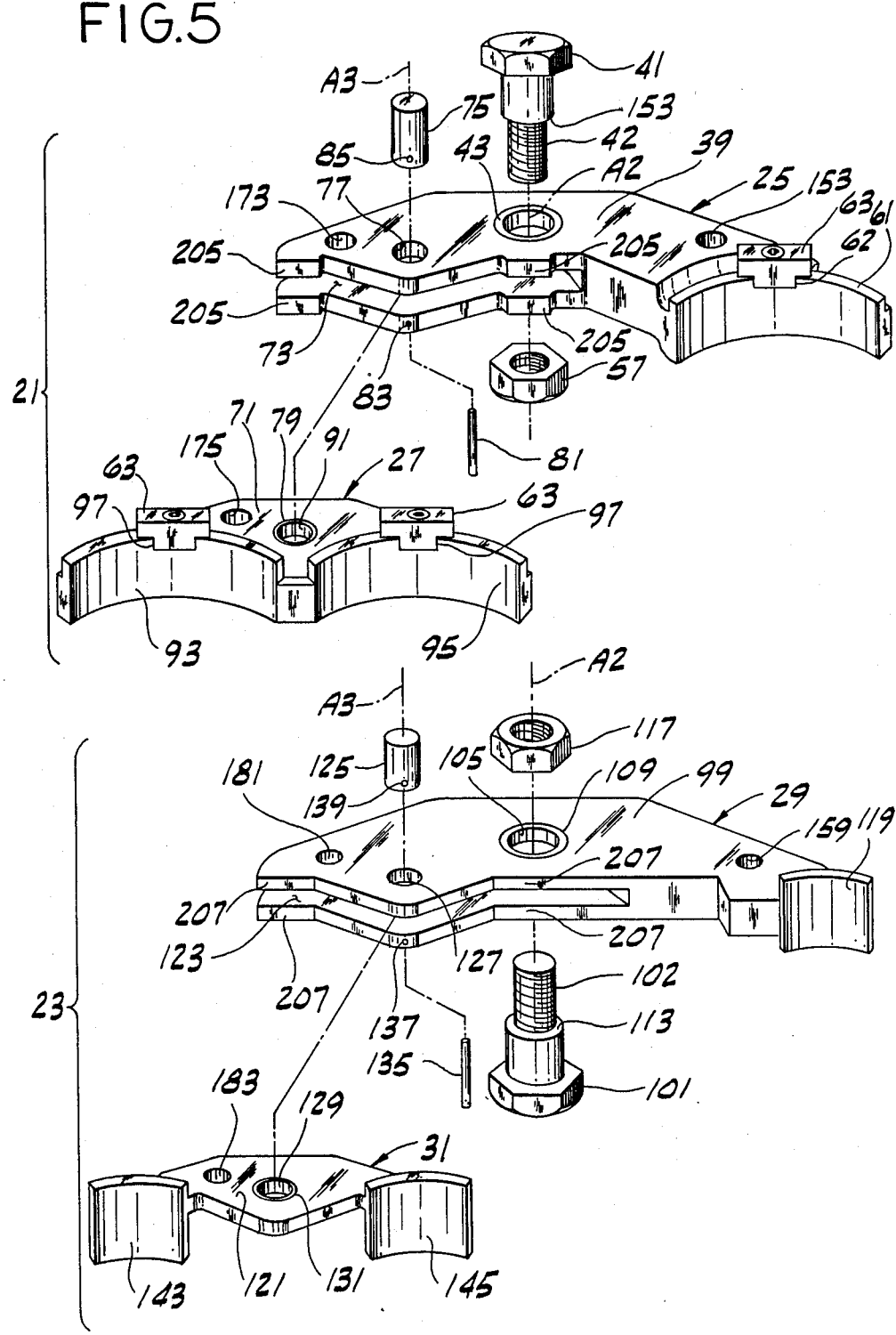
FIG. 5 is an exploded perspective view of the upper and lower mold holding assemblies.

The second upper holders 27 on mold arms 7A and 7B are also preferably of identical construction, each comprising a metal plate 71 considerably smaller in size than the bar 39 of the first upper holder 25. The plate 71 is received in a relatively deep horizontal recess 73 in the holder bar 39 extending inwardly from a peripheral side edge thereof, the height of the recess being only slightly greater than the thickness of the plate so that the fit of the plate in the recess is a relatively close clearance fit. The plate 71 is mounted on the upper holder bar 39 by means of a pin 75 extending through vertical bores 77, 79 in the bar 39 and plate 71, respectively, for pivotal movement of the plate in a generally horizontal plane relative to the holder bar 39 on axis A3, albeit only to a limited extent, as will appear. The pin 75 is retained in position by means of a removable retaining dowel 81 extending horizontally through aligned bores 83, 85 in the bar 39 and pin 75, respectively, as shown in FIGS. 5 and 6. A bushing 91 of wear-resistant material is press-fitted in the bore 79 through the plate 71. The plate 71 has a pair of arcuate flanges 93, 95 at one side thereof for holding a respective pair of mold members at their upper ends. The flanges 93, 95 are curved to conform to the shape of the mold members and are of the same size, shape and elevation as the flange 61 on the upper holder 25. Locating blocks identical to the locating blocks 63 described earlier are removably mounted in notches 97 on the flanges 93, 95 for precisely locating the mold members on the flanges.

The first lower holder 29 on the underside of the lower extension 13 of each mold arm 7A, 7B is similar to the first upper holder 25, comprising an elongate, relatively thick flat bar 99 of generally rectangular cross section pivoted generally at the center thereof to the lower mold arm extension 13 by means of a pivot member in the form of a shoulder bolt 101 having a shank 102 extending up through bushings 103, 105, 107 pressed in bores 109, 111 in the bar 99 and lower extension 13 of the mold arm for pivoting of the lower holder 29 on axis A2 to a limit extent, as will appear. The shank 102 of the bolt is formed with a shoulder 113 engageable with the underside of a wear plate 115 disposed between the holder bar 99 and lower mold arm extension 13. A nut 117 tightened on the upper end of bolt shank 102 retains the lower holder 29 on the mold arm, the distance between the head of the bolt 101 and the shoulder 113 of the bolt being slightly greater than the thickness of the holder bar 99 to ensure that the holder may freely pivot on axis A2 when the nut is tightened. The holder bar 99 has an arcuate flange 119 at one end curved to conform to the shape of a respective mold member. The mold member has a lug L adapted to hook over the upper edge of this flange, as shown in FIG. 4, for holding the mold member adjacent its lower end.

The lower second holder 31 is similar to the upper second holder 27 in that it comprises a relatively thin plate 121 received in a horizontal recess 123 in the lower holder bar 99 for pivoting on axis A3 via a pin 125 extending through a vertical bore 127 in the bar 99 and through a bushing 129 press-fitted in an opening 131 through the plate 121. The pin 125 is retained in position by a removable dowel 135 extending generally horizontally through aligned bores 137, 139 in the holder bar 99 and pin 125, respectively. The plate 121 has a pair of arcuate flanges 143, 145 at one side thereof engageable by lugs on a respective pair of mold members for supporting the mold members adjacent their lower ends. These flanges 143, 145 are of the same size, shape and elevation as the flange 117 on the lower first holder 29.

It is preferable that the range of pivotal movement of the upper and lower first holders 25, 29 and upper and lower second holders 27, 31 on the mold arms 7A, 7B be relatively small so as to minimize the swinging of the mold members for greater stability of the mold members, since excessive swinging may cause the mold members to become dislodged from their proper positions. This is accomplished in the manner described below.

Figure 7:
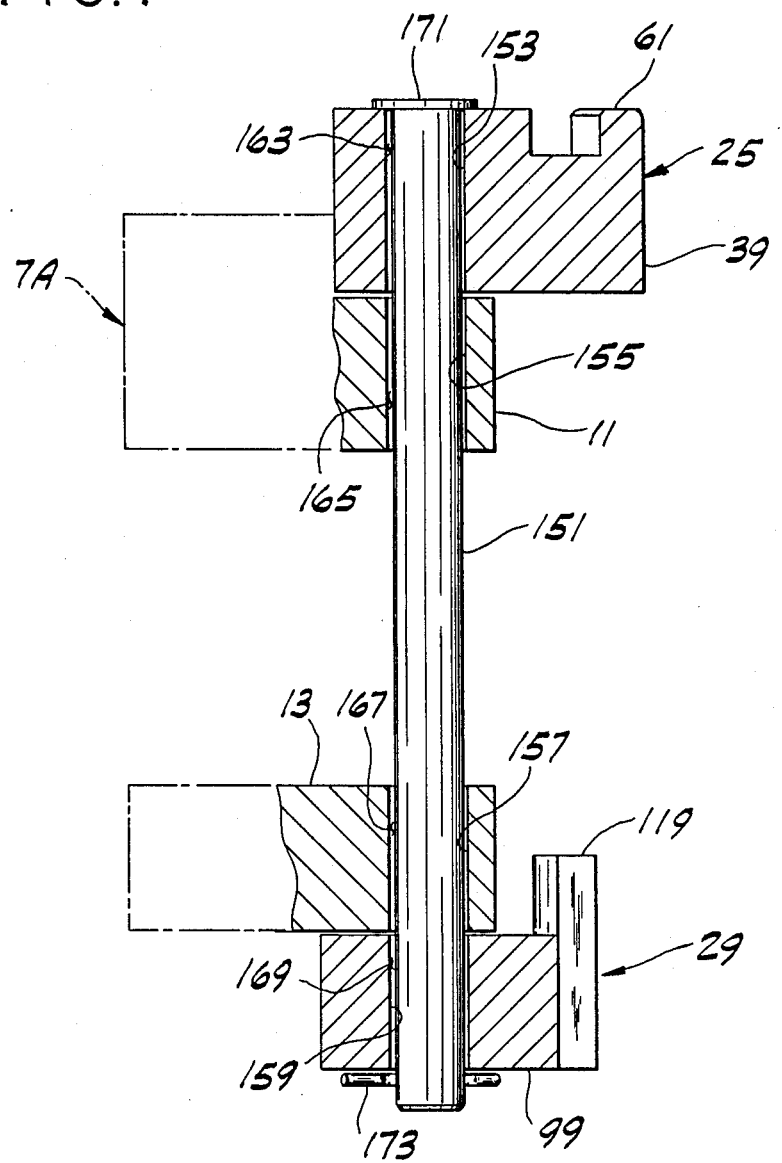
FIG. 7 is a vertical section on line 7—7 of Fig. 2.

Pivotal movement of the first upper and lower holders 25, 29 relative to the upper and lower mold arm extensions 11, 13 is limited by two relatively long stop pins 151, 152, one for each mold arm 7A, 7B. As illustrated in FIG. 7, the stop pin 151 associated with mold arm 7A extends vertically through aligned bores 153, 155, 157 and 159 through the upper holder bar 39, the upper extension 11 of the mold arm, the lower extension 13 of the mold arm, and the lower holder bar 99, respectively. The pin 151 has a diameter less than the diameter of these latter two bores to provide annular clearance spaces 163, 165, 167 and 169, respectively between the pin and the bore walls sufficient to permit limited pivotal movement of the upper and lower first holders 25, 29 on axis A2. These clearance spaces may be sufficient to permit the holders 25, 29 to pivot within a range of approximately 2°, for example. The pin 151 has a head 171 which rests on the upper surface of the upper holder bar 39 and is retained in position by means of a cotter pin 173 at the lower end of the pin. The stop pin 151 does not limit the pivotal movement of the holders 27, 31 relative to holders 25, 29.

Figure 8:
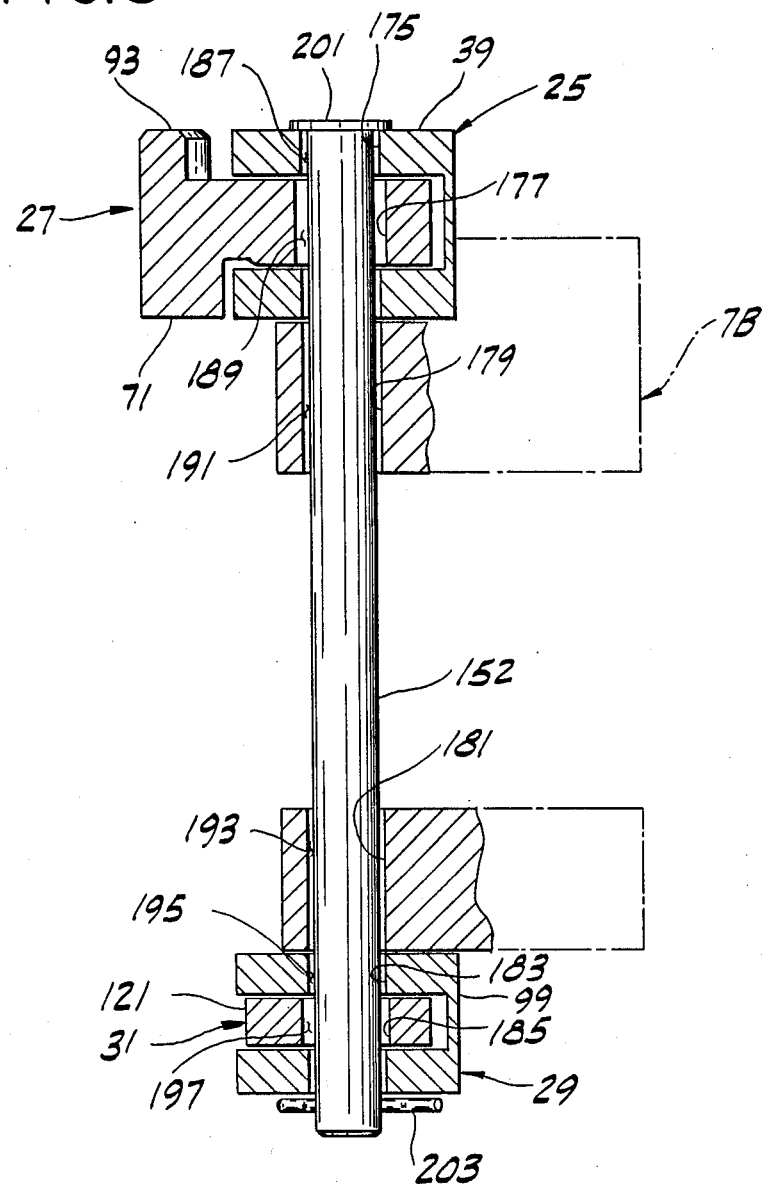
FIG. 8 is a vertical section on line 8—8 of Fig. 2.

Referring to FIG. 8, the stop pin 152 associated with mold arm 7B functions in a manner similar to pin 151, extending vertically through aligned holes 175, 177, 179, 181, 183, and 185 in the upper holder bar 39, upper holder plate 71, upper mold arm extension 11, lower mold arm extension 13, lower holder bar 99 and lower holder plate 121, respectively. The pin has a diameter less than the diameters of these bores to provide annular clearance spaces 187, 189, 191, 193, 195 and 197 between the pin and the bore walls, the clearance spaces 187, 191, 193 and 195 being sufficient to permit limited pivotal movement (e.g., 2°) of the holders 25, 29 on axis A2. The clearance spaces 189, 187 are substantially larger than the other clearance spaces, since the stop pin 152 is not intended to limit the pivotal movement of the upper and lower second holders 27, 31 relative to the upper and lower first holders 25, 29. The pin 152 has a head 201 which rests on the upper surface of the upper holder bar 39 and is retained in position by means of a cotter pin 203 at the lower end of the pin.

As noted, the stop pins 151 and 152 do not limit pivotal movement of the holders 27, 31 relative to holders 25, 29 on either mold arm 7A, 7B. This is accomplished in a different manner. Thus, pivotal movement of holder 27 relative to holder 25 is limited to movement within a relatively small range of movement (e.g., 2°) by the engagement of the locator blocks 63 on the holder 27 with flats 205 formed on the holder bar 39 (flats 205 thus constituting means for limiting pivotal movement of the holder 27). Similarly, pivotal movement of holder 31 relative to holder 29 is limited to movement within a relatively small range of movement (e.g., 2°) by the engagement of the flanges 143, 145 on the holder 31 with edges 207 of the holder bar 99 (such edges thus constituting means for limiting pivotal movement of the holder 31).

It will be observed that the first upper holder 25 on each mold arm has two bores 153, 173 therethrough adjacent opposite ends of the holder and that the lower first holder 29 on each mold arm has two bores therethrough 159, 181 adjacent opposite ends of the holder. This enables these holders 25, 29 to be used interchangeably on either mold arm 7A, 7B in the manner shown in FIGS. 1 and 2.

In operation, it will be understood from the foregoing that as the mold arms 7A, 7B close to the position shown in FIG. 1, the mold members held by respective upper and lower first holders 25, 29 and upper and lower second holders 27, 31 will automatically pivot on their respective axes A2 and A3 to final positions where the closing forces exerted on each of the three pairs of mold members are substantially equal. This is due not only to the fact that mold members 1A, 3A and 5A on mold arm 7A are able to pivot independent of mold members 1B, 3B and 5B on mold arm 7B, but also because at least one mold member on each mold arm is able to pivot independent of the other mold members on the same mold arm. Equalizing closing pressures as between all three pairs of molds ensures that all mold members properly mate with another and remain closed during the glass forming operation. The range of pivotal movement required to equalize the closing forces does not have to be great, but it is necessary that all mold members be able to pivot at least to some limited extent to accomplish the intended result.

While it is preferable that the construction of the upper and lower holding assemblies 21, 23 on one mold arm 7A be identical in construction to the upper and lower holding assemblies on the other mold arm 7B for reasons of economy and interchangeability of parts, it will be understood that this is not essential to the operation of the present invention and that the holding assemblies on opposite mold arms may be fabricated from parts which are not identical. It is also contemplated that each mold arm may be equipped with only one holding assembly rather than two, in which case the single holding assembly would be mounted between the upper and lower extensions 11, 13 of the mold arm. If only one holding assembly is used, certain modifications may be necessary. For example, the flanges supporting the mold members are preferably greater in height to provide the necessary stability to the mold members mounted thereon.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a glassware forming machine comprising a pair of carriers each pivoted on a first generally vertical axis for swinging movement toward and away from each other between an open position and a closed position, and a set of at least three mold members carried by each carrier, each mold member on each carrier being related to a mold member on the other carrier so that, with the carriers in their said closed position, each mold member on one carrier mates with a mold member on the other carrier to define a mold cavity for molding an item of glass, the improvement comprising at least one holding assembly on each carrier for holding a respective set of mold members, said holding assembly comprising:
   a first holder for holding one or more members of a respective set of mold members;
   means mounting said first holder on a respective carrier for pivotal movement of said first holder and said one or more mold members held thereby relative to the carrier on a second vertical axis;
   a second holder for holding the remaining mold members of a respective set of mold members; and
   means mounting said second holder on said first holder for pivotal movement of said second holder and said remaining mold members held thereby on a third vertical axis relative to said first holder and said one or more mold members held thereby,
the arrangement being such that, as the carriers swing to their said closed position and respective mold members move into mating relationship, the first and second holders of said holding assemblies, and the mold members held thereby, are adapted to pivot about their respective second and third axes to final positions wherein substantially the same closing pressure is applied to each pair of mating mold members.

2. A glassware forming machine as set forth in claim 1 wherein each carrier is in the form of a mold arm, said second pivot axes of the first holders of said holding assemblies on the mold arms being disposed in the same generally vertical plane extending transversely with respect to the mold arms when the mold arms are closed, and said third pivot axes of the second holders of said holding assemblies being located substantially equidistant from said vertical plane on opposite sides of the plane.

3. A glassware forming machine as set forth in claim 2 wherein the first holder of said holding assembly on each mold arm holds one mold member and the second holder of said holding assembly on each mold arm holds a pair of mold members, the arrangement being such that, when the mold arms are in their said closed position, the mold member held by the first holder of the holding assembly on one mold arm mates with one mold member of the pair of mold members held by the second holder of the holding assembly on the other mold arm, and the mold members held by the second holder of the holding assembly on said one mold arm mate with the mold member held by the first holder of the holding assembly on the other mold arm and with the other mold member of the pair of mold members held by the second holder of the holding assembly on the other mold arm.

4. A glassware forming machine as set forth in claim 3 wherein said first holders of the holding assemblies on the mold arms are fabricated as identical parts and said second holders of the holding assemblies on the mold arms are fabricated as identical parts.

5. A glassware forming machine as set forth in claim 4 wherein the first holder of each holding assembly comprises a relatively flat bar pivoted on a respective mold arm and having a recess therein extending generally horizontally inwardly from an outer peripheral edge thereof, said second holder of each holding assembly comprising a generally horizontal plate received in said recess, said means mounting said second holder on said first holder comprising a pivot member extending through aligned vertical bores in said bar and plate to enable pivotal movement of the second holder on said third generally vertical axis.

6. A glassware forming machine as set forth in claim 1 wherein the first holder of said holding assembly on each mold arm holds one mold member and the second holder of said holding assembly on each mold arm holds a pair of mold members, the arrangement being such that, when the mold arms are in their said closed position, the mold member held by the first holder of the holding assembly on one mold arm mates with one mold member of the pair of mold members held by the second holder of the holding assembly on the other mold arm, and the mold members held by the second holder of the holding assembly on said one mold arm mate with the mold member held by the first holder of the holding assembly on the other mold arm and with the other mold member of the pair of mold members held by the second holder of the holding assembly on the other mold arm.

7. A glassware forming machine as set forth in claim 1 wherein said first holders of the holding assemblies on the carriers are fabricated as identical parts and said second holders of the holding assemblies on the carriers are fabricated as identical parts.

8. A glassware forming machine as set forth in claim 1 wherein said first holder of the holding assembly comprises a relatively flat bar pivoted on a respective carrier and having a recess therein extending generally horizontally inwardly from an outer peripheral edge thereof, said second holder of the holding assembly comprising a generally horizontal plate received in said recess, said means mounting said second holder on said first holder comprising a pivot member extending through aligned vertical bores in said bar and plate to enable pivotal movement of the second holder on said third generally vertical axis.

9. A glassware forming machine as set forth in claim 1 further comprising means for limiting the pivotal movement of said first holder on said second axis to movement within a relatively small range of movement.

10. A glassware forming machine as set forth in claim 9 further comprising means for limiting the pivotal movement of said second holder on said third axis to movement within a relatively small range of movement.

11. A glassware forming machine as set forth in claim 9 wherein said means for limiting the pivotal movement of said first holder comprises a stop pin extending through vertically aligned bores in the holder and the respective carrier, said stop pin having a diameter less than the diameter of the bore through the first holder to provide an annular clearance between the pin and the wall of the bore to permit only limited pivotal movement of the first holder on said second axis.

* * * * *